Patented Aug. 7, 1951

2,563,079

UNITED STATES PATENT OFFICE 2,563,079

INHERENTLY PROCESSABLE INTERPOLYMERS OF VINYL CHLORIDE, HIGHER ALKYL ACRYLATE, AND VINYLIDENE CHLORIDE

Grant W. Smith, Grand Forks, N. Dak., assignor to The B. F. Goodrich Company, New York, N. Y., a corporation of New York No Drawing. Application April 29, 1950, Serial No. 159,123

7 Claims. (Cl. 260—80.5)

This invention relates to interpolymers obtained by the polymerization of monomeric mixtures containing at least three essential ingredients, one of which is vinyl chloride, another of which is a higher alkyl acrylate such as an octyl acrylate, and another of which is vinylidene chloride, which interpolymers are characterized by possessing a new combination of improved properties, especially in regard to their inherent plasticity and ease of processing combined with excellent resistance to the effects of heat and light and excellent impact resistance, and it pertains particularly to three-component interpolymers or tripolymers of these three types of monomers which are so inherently plasticized in nature as to be easily processed into excellent films, sheets, rods, tubes and plates without the addition of plasticizers.

Copolymers or two-component interpolymers of vinyl chloride with vinylidene chloride are well known, and because of their high solubility in organic solvents are particularly valuable for use in coating compositions. These copolymers, however, suffer from the disadvantage that they are relatively unstable when exposed to heat or light, and have a relatively low impact resistance. Copolymers of vinyl chloride and methyl or ethyl acrylate are likewise well known, and because of their relatively low softening points (when plasticized) are particularly suitable for use in calendering and coating operations where high temperatures are not desirable. The copolymers of vinyl chloride with vinylidene chloride, methyl acrylate, diethyl fumarate, vinyl acetate and other vinyl resins are, however, in their unplasticized state relatively horny at moderate temperatures and are generally incapable of being easily subjected to processing operations such as milling, calendering, extruding, etc., without heating the resin to high temperatures. Addition of plasticizers, which generally are of the oily ester-type, lowers the softening point of the composition such that processing operations may be carried out at lower temperatures and renders the final vinyl resin composition soft and flexible. However, addition of plasticizer concomitantly lowers the room temperature hardness of the plasticized composition and frequently makes the resin tacky and introduces difficulties of bleeding, extraction and volatilization of plasticizer with consequent hardening and stiffening of the plasticized composition in service. It is difficult, therefore, to produce a plasticized vinyl resin composition which is easily processed yet which at normal temperatures is sufficiently hard without being stiff and horny in nature.

It is a primary object of this invention, therefore, to provide a new class of vinyl resins each member of which is possessed of many of the desirable properties of known vinyl resins but which is so inherently processable as to not require the addition of plasticizers either during processing or to achieve desirable plastic properties in the final product and which on that account can be employed to produce numerous articles of greatly improved serviceability. It is also an object of this invention to provide a new class of vinyl resins each member of which is easily processed at moderate temperatures yet which is hard and tack-free without excessive stiffness in the final end-product.

It has now been discovered that by polymerizing monomeric mixtures containing at least three essential ingredients, one being vinyl chloride, another being a higher alkyl acrylate, and the third being vinylidene chloride there are obtained interpolymers having a high solubility in organic solvents, improved resistance to the effects of light and heat, improved impact resistance, and in addition which are so inherently processable as not to require the addition of plasticizers to be processed at moderate temperatures or to be possessed of desirable plastic properties in the end-product, as well as being relatively hard and tack-free without excessive stiffness.

The relative proportions of monomers which may be employed in the production of such new interpolymers are somewhat critical, since the desired properties are not secured in any proportion, but may vary somewhat within certain limits. In the monomeric mixture it is necessary to employ from 40 to 80% by weight of vinyl chloride, from 2 to 40% by weight of alkyl acrylate and from 2 to 40% by weight of vinylidene chloride with at least 90% by weight of the total monomeric mixture being made up of these three ingredients. Other monomeric materials such as vinyl acetate, vinyl benzoate, diethyl maleate, acrylonitrile, lower alkyl acrylates such as methyl and ethyl acrylate, isobutylene, styrene and others, are utilizable in amounts of up to 10% by weight of the total monomeric mixture, if desired, but since the use of additional monomers does not result in additional improved properties, it is, of course, preferred to utilize only the three essential monomeric materials.

The higher alkyl acrylates which are employed in this invention are those alkyl esters of acrylic acid in which the alkyl group contains a chain of from 4 to 10 carbon atoms. It has been found that the degree of plasticity or inherent processability imparted to interpolymers by these higher alkyl acrylates corresponds roughly with the observed degree of plasticization imparted to ordinary vinyl resins by addition thereto of ester-type plasticizers containing similar alkyl groups. For example, di-2-ethylhexyl phthalate is an excellent plasticizer for vinyl chloride polymers and 2-ethylhexyl acrylate has been found to produce interpolymers of excellent inherent processability. Likewise, dibutyl phthalate is a plasticizer for vinyl chloride resins and n-butyl acrylate has been found to produce interpolymers which are processable without plasticizers but which at normal temperatures are considerably harder than those made from 2-ethylhexyl acrylate. Illustrative compounds within the above class of higher alkyl acrylates are n-butyl acrylate, isobutyl acrylate, n-amyl acrylate, n-hexyl acrylate, the isohexyl acrylates, isoheptyl acrylate, n-heptyl acrylate, capryl acrylate (1-methylheptyl acrylate), n-octyl acrylate, 2-ethylhexyl acrylate, isooctyl acrylates such as 6-methylheptyl acrylate, n-nonyl acrylate, isononyl acrylates such as 3,5,5-trimethylhexyl acrylate, n-decyl acrylate and others.

When interpolymers of considerable plasticty are desired, it is preferred to employ higher alkyl acrylates in which the alkyl group contains a total of 6 to 10 carbon atoms and possesses a carbon chain of from 6 to 8 carbon atoms in length. Compounds within this class are n-hexyl acrylate, n-heptyl acrylate, 1 - methylheptyl acrylate, 2-ethylhexyl acrylate, 3,5,5-trimethylhexyl acrylate, n-octyl acrylate and others. Higher alkyl acrylates of this class impart a high degree of inherent processability to their interpolymers with vinyl chloride and vinylidene chloride and n-octyl acrylate has been found to be the most efficient in this respect.

The polymerization may be carried out in the conventional manner. The mixture of monomers may be polymerized in solution in a suitable solvent, or in aqueous dispersion, or the polymerization may be carried out in the absence of any solvent or diluent. Best results are achieved by carrying out the polymerization in aqueous dispersion, from which the product may be obtained in the form of a latex which is highly stable, or in the form of small granules. Polymerization in aqueous emulsion may be carried out in the presence of any of the emulsifying agents such as the fatty acid soaps including sodium oleate, potassium palmitate, and the like, the rosin acid or disproportionated rosin acid soaps, and the synthetic saponaceous materials such as sodium lauryl sulfate, sodium isopropyl naphthalene sulfonate, decyl benzene sodium sulfonate, the sodium petroleum sulfonates, the sodium salts of polymerized alkaryl sulfonic acids, the sodium salt of n-octadecyl-N-1,2-dicarboxyethyl sulfosuccinamate, the dioctyl ester of sodium sulfosuccinic acid and others.

Any of the catalysts commonly employed for the polymerization of vinyl compounds may be employed in preparing my new interpolymers. Actinic radiation may be employed, as well as various peroxygen compounds such as hydrogen peroxide, potassium persulfate, sodium perborate, benzoyl peroxide, caprylyl peroxide, or the like. In order to control the hydrogen ion concentration of the polymerization mixture, any of the usual buffer systems may be used; for example, sodium bicarbonate, sodium acid phosphate, lead acetate, ammonium hydroxide, or the like.

While the polymerization may be carried out in the presence of air, the rate of reaction is ordinarily faster in the absence of oxygen. The particular temperature at which the polymerization reaction is carried out is not critical; it may be varied over a wide range from −30° C. up to 100° C. or even higher; best results are generally obtained, however, at a temperature from about 0° C. to about 70° C. All of the monomeric materials need not be introduced into the reaction mixture at the start of the reaction, but any one or more of the monomers may be added gradually during the course of the polymerization in order to minimize variations in the rate of reaction and to improve the homogeneity of the product.

The following specific examples are intended merely as illustrations of the nature of my invention and not as limitations upon the scope thereof.

EXAMPLE 1

|  | A | B | C |
|---|---|---|---|
| Vinyl Chloride | 60 | 60 | 60 |
| Vinylidene Chloride | 20 | 20 | 20 |
| n-butyl acrylate | 20 |  |  |
| 2-ethylhexyl acrylate |  | 20 |  |
| 3,5,5-trimethylhexyl acrylate |  |  | 20 |
| Potassium persulfate | 0.4 | 0.5 | 0.5 |
| Ammonia |  | 0.2 | 0.2 |
| Sodium bicarbonate | 0.1 |  |  |
| ¹Emulsifier | 4.0 | 4.0 | 4.0 |
| Water | 90.0 | 95.0 | 95.0 |

¹ Sodium lauryl sufate.

The aqueous phase of the mixtures and solid materials soluble therein are placed in a polymerization vessel, the vessel sealed and evacuated, and the vacuum broken by addition of the monomeric materials and ammonia (if any). The resulting mixtures are agitated and heated to reaction temperature. Mixtures A and B polymerize in 15 hours at 50° C. to produce from mixture A a latex containing 52.5% total solids and from mixture B a latex containing 51.1% total solids. Mixture C polymerizes in 36 hours at 45° C. to produce a latex containing 51.1% total solids.

The latices are utilized directly after being thickened with 1% by weight based on the polymer solids of carboxyethyl cellulose for the production of unsupported films. The table, below, summarizes the properties of the films produced:

Table

|  | A | B | C | D¹ |
|---|---|---|---|---|
| Fusior Temp., ° C | 100 | 155 | 150 | 150 |
| Tensile Strength, lbs./sq. in | 4,250 | 3,700 | 2,250 | 1,950 |
| Elongation, Percent | 150 | 370 | 100 | 275 |
| Graves Tear | 980 |  |  | 396 |
| Heat Aging—after 7 days @ 100° C.: |  |  |  |  |
| Tensile, lbs./sq. in | 4,250 | 3,700 | 2,250 | 5,000 |
| Elongation, Percent | 150 | 330 | 100 | 0 |
| Light Stability ² | 220 | 196 | 280 | 180 |
| Heat Stability ³ | −0.16 |  |  | −0.38 |

¹ A film produced from a plasticized latex of a copolymer of 75% vinyl chloride and 25% vinylidene chloride plasticized with 25 parts/100 parts of resin of di-2-ethylhexyl phthalate (included for comparison purposes).
² Time in hours elapsed under exposure to ultraviolet light until brittleness develops.
³ Slope of the curve of tensile strength versus time of heating at 100° C. Lesser slope indicates greater heat stability.

The data reported in the table show that tripolymers A, B and C are adapted to the production of unsupported film, and that tripolymers A and B are the best in this regard. All three of the latices deposit clear, continuous tack-free films at room temperature and as a consequence may be utilized as antitranspirant coatings for growing plants and for fruits, vegetables, etc.; for low temperature coating of delicate fabrics, leathers, etc.

The solid tripolymers obtained by spray drying the latices described above are found to process very easily. For example, they form a smooth band on a plastic mill at roll temperatures of only 150 to 160° F. By contrast, a copolymer of 80% vinyl chloride and 20% vinylidene chloride when plasticized with 20 to 35% by weight of di-2-ethylhexyl phthalate requires mill roll temperatures of 270° F. and polyvinyl chloride requires roll temperatures of 290° F. or more. Tripolymers A and C have a hardness of 100 durometer A and are admirably suited for extrusion or injection molding materials. Tripolymer B is a relatively softer material than the others and is especially adapted to the production of soft, flexible calendered sheets, fabric coatings and flexible extruded and injection molded articles.

A tripolymer similar to those of Example 1 is produced by the polymerization of a mixture consisting of 60% by weight of vinyl chloride, 20% 1-methylheptyl acrylate, and 20% vinylidene chloride. Unsupported film produced from the tripolymer latex is tough but very flexible.

EXAMPLE 2

In a similar manner, a mixture consisting of 40% by weight of vinyl chloride, 40% vinylidene chloride, and 20% 2-ethylhexyl acrylate is polymerized in the presence of 0.8% potassium persulfate in 15.5 hours at 45° C. The product is a latex containing 52.7% total solids. A film of the latex is spread on a clean smooth surface and allowed to dry at room temperature. The film is then stripped off and found to be tack-free, soft (70 durometer A), and very flexible and tough.

EXAMPLE 3

A tripolymer made in the manner shown in Example 1 from a mixture consisting of 65% by weight of vinyl chloride, 30% 2-ethylhexyl acrylate, and 5% vinylidene chloride is a fairly hard material (80 durometer C), having a tensile strength of 2500 lbs./sq. in. and an elongation of 220%. Despite its hardness, the tripolymer is easily formed into a smooth band with mill roll temperatures of only 150° F. The tripolymer extrudes at temperatures of 240° F. to form very smooth, glossy strips, tubes and rods having considerable flexibility. The polymer is especially adapted to the production of unsupported films by the process which comprises extrusion of a tube having a fairly thick cross section and then blowing the tube in order to obtain a very thin film.

EXAMPLE 4

A tripolymer very similar to that of Example 3 is produced from a mixture consisting of 70% by weight of vinyl chloride, 20% 2-ethylhexyl acrylate, and 10% of vinylidene chloride. It possesses a hardness of 83 durometer C and can be easily milled at 150 to 160° F.; it has a tensile strength of 2200 lbs./sq. in., an elongation of 250%, and a modulus at 100% elongation of 1800 lbs./sq. in.

EXAMPLE 5

A tripolymer is prepared by polymerization in aqueous emulsion of a monomeric mixture consisting of 80% by weight of vinyl chloride, 10% by weight of n-octyl acrylate, and 10% of vinylidene chloride. The tripolymer is hard, but flexible, and can be milled at 200° F., extruded at 200 to 225° F., and calendered at 240° F.

EXAMPLE 6

The foregoing examples have illustrated the preparation of three-component interpolymers. Multi-component interpolymers having good properties also may be produced from monomeric mixtures containing four or more monomers. For example, a mixture consisting of 40% by weight of vinyl chloride, 30% by weight of 3,5,5-trimethylhexyl acrylate, 20% vinylidene chloride and 10% ethyl acrylate polymerizes in a medium similar to that of Example 1 to produce a 50% total solids tetrapolymer latex. The latex has good film forming properties at 150° C. and produces a soft, flexible film having a hardness of 72 durometer A and excellent resistance to the effects of ultraviolet light. Similarly, a tetrapolymer obtained by the polymerization of a mixture of 40% vinyl chloride, 35% 3,5,5-trimethylhexyl acrylate, 15% vinylidene chloride and 10% by weight of styrene is a resin having a hardness of 98 durometer A, yet in latex form will form excellent, flexible and clear films at 150° C. which have very good light and heat resistance.

The present application is a continuation-in-part of my copending application Serial No. 649,741, filed February 21, 1946, and now abandoned.

Although I have herein described specific embodiments of my invention, I do not intend to limit myself solely thereto, but to include all of the obvious variations and modifications falling within the spirit and scope of the appended claims.

I claim:

1. An interpolymer made by polymerizing a mixture of monomeric materials comprising from 40 to 80% by weight of vinyl chloride, 2 to 40% by weight of an alkyl ester of acrylic acid in which the alkyl group contains a chain of 4 to 10 carbon atoms, and from 2 to 40% by weight of vinylidene chloride.

2. A tripolymer made by polymerizing in aqueous emulsion a mixture of monomeric materials consisting of from 40 to 80% by weight of vinyl chloride, from 2 to 40% by weight of an alkyl ester of acrylic acid in which the alkyl group contains a total of 6 to 10 carbon atoms and possesses a carbon chain of from 6 to 8 carbon atoms in length, and from 2 to 40% by weight of vinylidene chloride.

3. A tripolymer made by polymerizing in aqueous emulsion a mixture of monomeric materials consisting of from 40 to 80% by weight of vinyl chloride, from 2 to 40% by weight of 2-ethylhexyl acrylate and from 2 to 40% by weight of vinylidene chloride.

4. A tripolymer made by polymerizing in aqueous emulsion a mixture of monomeric materials consisting of from 40 to 80% by weight of vinyl chloride, from 2 to 40% by weight of n-butyl acrylate and from 2 to 40% by weight of vinylidene chloride.

5. A tripolymer made by polymerizing in aqueous emulsion a mixture of monomeric materials consisting of from 40 to 80% by weight of vinyl chloride, from 2 to 40% by weight of n-octyl acrylate and from 2 to 40% by weight of vinylidene chloride.

6. A tripolymer made by polymerizing in aqueous emulsion a mixture of monomeric materials consisting of from 40 to 80% by weight of vinyl chloride, from 2 to 40% by weight of 3,5,5-trimethylhexyl acrylate and from 2 to 40% by weight of vinylidene chloride.

7. A tripolymer made by polymerizing in aqueous emulsion a mixture of monomeric materials consisting of from 40 to 80% by weight of vinyl chloride, from 2 to 40% by weight of 1-methylheptyl acrylate and from 2 to 40% by weight of vinylidene chloride.

GRANT W. SMITH.

No references cited.